United States Patent [19]

Komine et al.

[11] Patent Number: 4,636,042

[45] Date of Patent: Jan. 13, 1987

[54] MECHANICAL MOUNTING FOR ZOOM LENS

[75] Inventors: Yoshio Komine, Kanagawa; Kenichi Kawamoto, Tokyo, both of Japan

[73] Assignee: Canon Kabushiki Kaisha, Tokyo, Japan

[21] Appl. No.: 573,365

[22] Filed: Jan. 24, 1984

[30] Foreign Application Priority Data

Jan. 26, 1983 [JP] Japan .................................. 58-11053

[51] Int. Cl.⁴ ............................................... G02B 7/04
[52] U.S. Cl. .................................................. 350/429
[58] Field of Search ........................................ 350/429

[56] References Cited

U.S. PATENT DOCUMENTS

| | | | |
|---|---|---|---|
| 3,506,338 | 4/1970 | Holderbaum | 350/429 |
| 3,765,748 | 10/1973 | Mito | 350/429 |
| 4,272,160 | 6/1981 | Uesugi | 350/429 |
| 4,273,423 | 6/1981 | Uesugi | 350/429 |
| 4,315,670 | 2/1982 | Shigoku | 350/429 |
| 4,472,032 | 9/1984 | Kamata et al. | 350/429 |

Primary Examiner—John K. Corbin
Assistant Examiner—Loha Ben
Attorney, Agent, or Firm—Toren, McGeady & Goldberg

[57] ABSTRACT

A mechanical mounting for a zoom lens having a tubular body in which is rotatably fitted a cam sleeve for controlling the axial movements of optical elements contributing to a zooming action. In order to keep the axial position of the cam sleeve relative to the body tube with a high precision accuracy as it rotates about the optical axis, a restraining mechanism is constructed in the form of rollers radially extending from the cam sleeve into a fitted circumferential interior recess of the body tube.

3 Claims, 5 Drawing Figures

MECHANICAL MOUNTING FOR ZOOM LENS

BACKGROUND OF THE INVENTION

1. Field of the Invention

This invention relates to a mechanical mounting for a zoom lens, and more particularly to a structure for restraining a rotatable cam sleeve having variator and compensator control camming slots from axial movement when it is fitted in a tubular body.

2. Description of the Prior Art

The zoom lenses for TV cameras and motion picture cameras have generally been mounted in a mechanism such that a rotatable cam sleeve for changing the axial positions of the variator and compensator is fitted onto the inner surface of a body tube, and, in order to restrain the aforesaid cam sleeve from axial movement, the aforesaid body tube or a member fixedly secured thereto, is provided with a pair of positioning collars at the front and rear ends of the entire length of the cam sleeve. For example, U.S. Pat. No. 3,610,733 discloses such a zoom lens mounting.

The use of this prior art restraining means, however, requires that the clearance between the cam sleeve and the positioning collars be made optimum. If the clearance is too large, the imaging performance is lowered by the change in the axial position of the cam sleeve. If it is too small, the driving torque is caused to increase, causing inconvenience to the photographer. Particularly when the body tube and the cam sleeve are made of different materials, it cannot be avoided for the clearance necessarily to be at a larger value due to the discrepancy in coefficient of linear expansion by temperature change. To absorb the backlash of the cam sleeve owing to the clearance, use must be made of an axially tensioned spring member between the tubular body and the cam sleeve. This produces a disadvantage of increasing the driving torque for the zooming operation.

It is, therefore, an object of the present invention to eliminate the above-described drawbacks of the prior art and to provide a mechanical mounting for a zoom lens with means making it possible to limit the axial backlash of the cam sleeve to a minimum and also to maintain the variation of the driving torque with variation in the ambient temperature at a minimum so that zooming can be performed always by a small driving torque.

SUMMARY OF THE INVENTION

Briefly, the present invention may be described as a mechanical mounting for a zoom lens which comprises a cam sleeve for controlling axial movement of optical elements contributing to a zooming action, said cam sleeve being fitted either in an inner diameter, or on an outer diameter, of a body tube, and rotating relative to the body tube to move the optical elements in different relation. The body tube being provided with a circumferential groove or slot formed on the inner or outer surface thereof, and said cam sleeve being provided with an engaging member radially extending therefrom into said groove or said slot so as to turn said cam sleeve about an optical axis while it is restrained from axial movement.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE PREFERRED EMBODIMENTS

Figure 1:
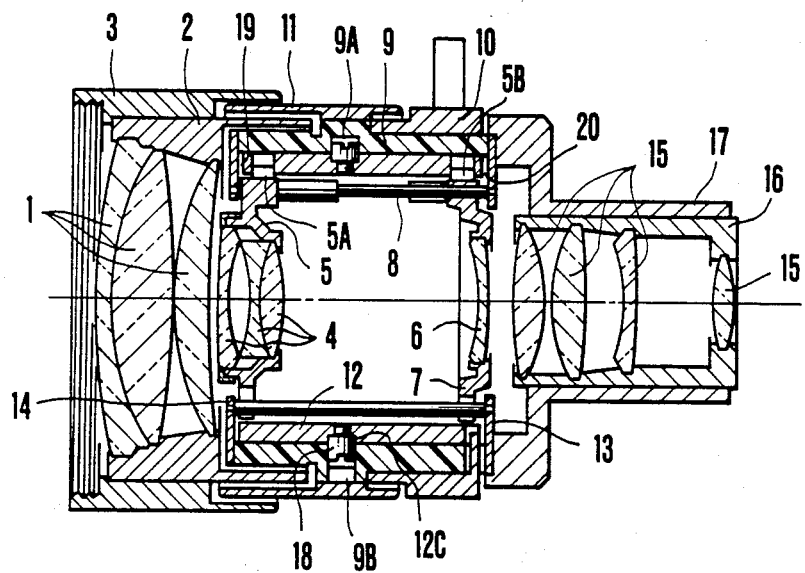
FIG. 1 is a longitudinal section view of an embodiment of a mechanical mounting for a zoom lens according to the present invention.

In FIG. 1 there is shown an embodiment of the zoom lens mounting mechanism according to the present invention where the zoom lens has a front component 1 for focusing held in a cell 2 which has a female-helicoid (not shown) and on which is fixedly mounted a focusing ring 3. A second component 4 comprising the variator and a third component 6 comprising the compensator are held in respective cells 5 and 7 which are axially movably supported by two bars 8 in a fashion known in the art. A body tube 9 has a male-helicoid (not shown) formed in a front outer surface portion thereof and carries the aforesaid focusing lens cell 2 with a meshing relationship of said male-helicoid with the female-helicoid. A zoom actuator 10 is rotatably fitted on a rear half of the outer surface of the body tube 9. An outer barrel 11 is fixedly fitted on the body tube 9 at the center of the axial length thereof. Rotatably fitted in the inner diameter of the body tube 9 is a cam sleeve 12. A rear cross-wall 13 is fixedly secured to the body tube 9, but may be otherwise formed as a portion of the body tube. A front cross-wall 14 is also fixedly secured to the body tube 9, and constitutes a carrier for the two bars 8 together with the rear one 13. An image forming lens component 15 is held in a cell 16 which is fixedly fitted in an adapter 17.

Figure 2:
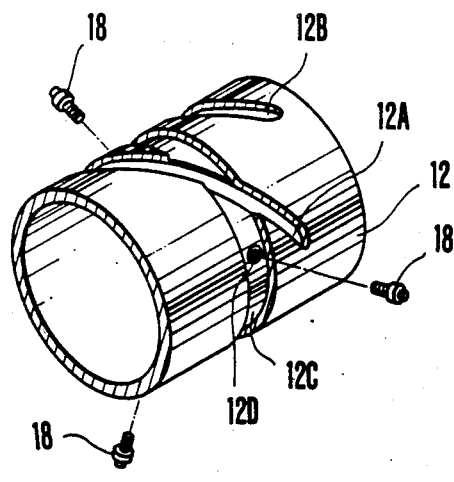
FIG. 2 is a perspective view of the cam sleeve of FIG. 1.

The adapter 17 supports the operating mechanism for the zoom components in front of the aforesaid rear cross-wall 13 and has coupling means (not shown) for attachment to the camera. The aforesaid cam sleeve 12 only is exclusively illustrated in the perspective view of FIG. 2, it being provided with a first camming slot 12A for the variator and a second camming slot 12B for the compensator, in which are engaged respectively cam follower pins 5A and 5B radially extending from the aforesaid lens cells 5 and 7 (FIG. 1). A cylindrical outer recess 12C is machined in the cam sleeve 12 and has a plurality of engaging pins 18 screw-threadedly fixed in respective radial holes 12D formed therein. Since, at this time, the diameter of the head of the aforesaid engaging pin 18 is exactly equal to the width of the aforesaid outer recess 12C, when the heads of the pins 18 are snugly seated to the half in the recess 12C they take the same axial positions in angular-displaced relation to each other. The body tube 9 is provided with a circumferential detent inner recess 9A into which all the engaging pins 18 project outwardly of the aforesaid cam sleeve 12 with high precision accuracy. At least one penetration hole 9B is radially formed in alignment with the detent recess 9A to allow for installation of the engaging pins 18 from the outside of the tubular body 9.

In this embodiment, the cam sleeve 12 is made of a popular material or aluminum alloy, and the body tube is made of plastics instead of the metal which was heretofore commonly used, the advantages being that the helicoid portion and other very complicated structures can be formed accurately with ease by molding techniques, the production cost can be reduced, and a large reduction of the weight can be achieved. On the other hand, according to the above-described prior art example of controlling the overall axial length of the cam sleeve in restraining the cam sleeve from axial movement, because the plastics varies in dimensions with temperature at a higher rate than the metal does, the use of the plastics in the body tube causes difficulty with regard to realising a zoom lens mounting mechanism which compromises the requirements of preserving high grade of imagery and of always enabling the operator to manage the zoom actuator with a light frictional resistance to movement. In lenses for cameras such as for a video camera, motorized zooming is the common practice. Therefore, an eventual increase in the driving torque for the zoom components can be a serious drawback. For this reason, most of the prior art mounting mechanisms have been obliged to employ the same aluminum alloy as that of the cam sleeve in making up the body tube. According to the illustrated embodiment of the present invention, however, the change in the axial position of the cam sleeve is made to depend only upon the tolerances of the engaging pins 18 and the detent recess 9A therefor. Therefore, the variation with temperature of the entire length of the body tube 9 is absorbed by large clearances at the front and rear of the cam sleeve 12 so as not to influence the accuracy of zoom control and the driving torque.

Figure 3:
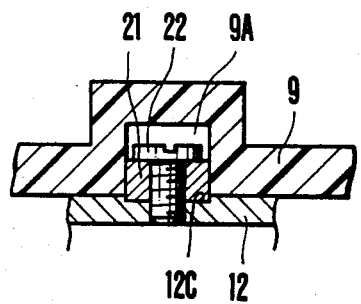
FIG. 3 is a sectional view which illustrates the restraining arrangement between the cam sleeve and the tubular body.

FIG. 3 illustrates an example of a modification of the engaging member in the restraining means. The engaging member is constructed in the form of a roller 21 on a shaft 22 which also serves as a screw retainer for the roller 21, with some play therebetween. The diameter of the roller 21 is exactly equal to the width of the detent recess 12C. Since it is impossible to assemble three screw-threaded shafts 22 with the cam sleeve 12 in exactly the same lateral plane and in exactly normal relation to the surface of cam sleeve 12, the provision of the looseness between the roller and shaft therefore admits a very light frictional resistance to movement of the cam sleeve 12 relative to the body tube 9, which still maintaining the high accuracy of zoom control.

The present invention is not confined to be applied to the above-described field of art, or TV cameras and motion picture cameras, but is applicable to lens mountings for single lens reflex cameras and video cameras.

Of the above-described various camera lenses, there are those having a macro-photographic function. It is, therefore, known to provide a mounting mechanism having an intermediate sleeve for macro-photography. (For example, from U.S. Pat. No. 4,322,150).

Figure 4:
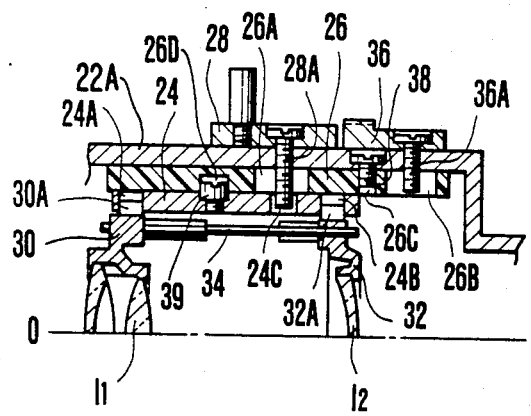
FIG. 4 is a fragmentary section view of another example of an application to a zoom lens mounting capable of macro photography.

FIG. 4 illustrates an example of the application of the present invention to a lens mounting having an intermediate sleeve for macro-photography.

In FIG. 4, 22A is a fixed sleeve; 24 is a cam sleeve provided with cam slots 24A and 24B; 26 is an intermediate sleeve lying between the fixed sleeve 22A and the cam sleeve 24; 28 is a zoom actuator ring fitted on the outer surface of the fixed sleeve 22A; and an engaging pin 28A is fixed to said zoom actuator ring 28 and extends through a concentric slot 26A provided in the intermediate sleeve 26 into a groove 24C of the cam sleeve 24. A variator lens $l_1$ and a compensator lens $l_2$ are engaged with the cam slots 24A and 24B of the aforesaid cam sleeve by lens cells 30 and 32 and engaging portions 30A and 32A. 34 are guide rods of the cells 30 and 32 fixed relative to the fixed sleeve 22A in parallel with an optical axis 0.

36 is a macro operating member fitted on the fixed sleeve 22A, having an engaging pin 36A fixed thereto of which the free end engages in a longitudinal groove 26B provided in said intermediate sleeve.

38 is a guide pin fixed to the fixed sleeve 22A and its end engages with a camming groove 26C formed in the intermediate sleeve 26.

In the lens mounting mechanism of FIG. 4, when the zoom operating ring 28 is turned about the optical axis, the aforesaid cam sleeve 24 turns together with the zoom operating ring 28 by the engaging pin 28A. By rotative movement of the cam sleeve 24, the variator lens $l_1$ and the compensator lens $l_2$ are axially moved in different relation depending upon the leads of the camming slots 24A and 24B to adjust the focal length of the entire system.

When the macro operating member 36 is turned, rotative power is transmitted through the pin 36A to the intermediate sleeve 26, whereby the intermediate sleeve 26 is axially moved by the engaging relation of the pin 38 and camming groove 26C. By movement of the intermediate sleeve 26, the cam sleeve 24, variator lens $l_1$ and compensator lens $l_2$ are axially moved as a unit, until the optical system is set in the macro photographing position.

Even in the lens mounting mechanism of such construction as shown in FIG. 4 and operating in the above-described manner, there is a similar problem to that described in connection with FIG. 1, arising from the manufacturing and assembling errors of the cam sleeve 24 and intermediate sleeve 26.

To solve that problem, the intermediate sleeve 26 is provided with a circumferential inner recess 26D in which an engaging pin 39 fixed to the cam sleeve 24 is fitted. By this engaging pin 39, the engaging position of the intermediate sleeve 26 is maintained at a constant point so that the frictional resistance to movement of the cam sleeve can be prevented from increasing as the temperature changes.

Figure 5:
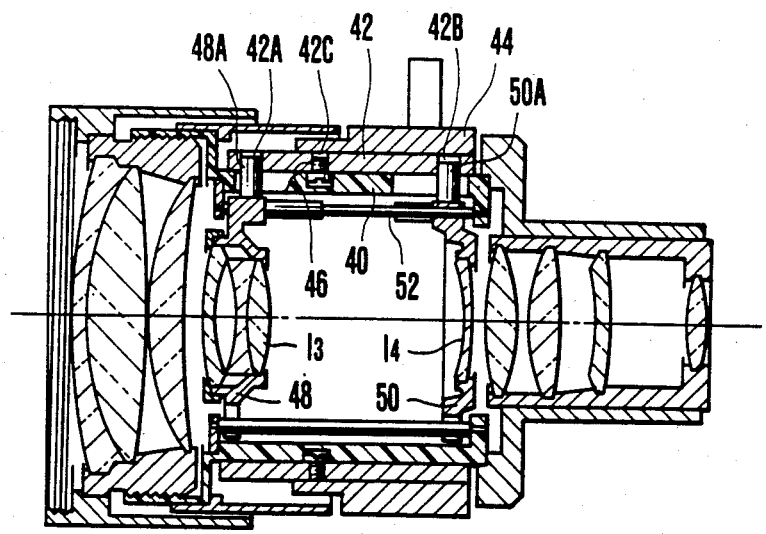
FIG. 5 is a sectional view of another embodiment of the present invention.

FIG. 5 illustrates another example of application to a lens mounting mechanism of different structure.

The example of FIG. 5 is to arrange a cam sleeve 42 and a zoom operating ring 44 on the outer surface of a fixed sleeve 40 in this order from the inside and to fix an engaging pin 46 to the fixed sleeve 40 at one end thereof, the opposite end of which engages in a circumferential recess 42C of the cam sleeve 42. A variator lens 13, a compensator lens 14, lens cell 48 and 50, cam follower pins 48A and 50A, camming slots 42A and 42B of a cam sleeve 42, and guide bars 52 are similar in construction and arrangement to those of FIG. 1.

In the embodiments of FIGS. 1 and 5, the circumferential recess may be otherwise provided in the cam sleeve, and the engaging pin 18 or 46 in the body tube.

As has been described in greater detail above, according to the present invention, despite the use of plastic in the body tube, the axial position of the cam sleeve relative to the tubular body is stabilized against eventual change, and the driving torque of the zoom actuator can be maintained also constant at a light level as the ambient temperature changes, while still permitting the complete mechanical mounting for zoom lens to be constructed in a simple form.

It is to be noted that though the foregoing embodiments of the invention have been described in connection with the circumferential outer recess 12C which facilitates fine adjustment in axial position of the three engaging pins 18 when they are put on the outer surface of the cam sleeve in the assembly line, this circumferential outer recess 12C may be omitted for the purpose of further simplifying the structure of the mounting mechanism. In this case, the entire length of the pins 18 is exposed out of the surface of the cam sleeve and projects into the circumferential inner recess of the body tube 9. However, the use of the outer recess 12C produces not only the advantage that a plurality of pins can be brought into a concentric relation to each other about the optical axis with high precision accuracy, but also the advantage that as illustrated in FIG. 3, the arrangement of each roller 21 across the interface between the cam sleeve and the body tube makes sure the prescribed accuracy of axial position control of the cam sleeve is preserved even after a long period of use and subjection to severe atmospheric conditions.

While specific embodiments of the invention have been shown and described in detail to illustrate the application of the inventive principles, it will be understood that the invention may be embodied otherwise without departing from such principles.

What we claim:

1. A mechanical mounting for a zoom lens defining an optical axis and including a body tube, an optical element and a zoom ring, comprising:
   a cam sleeve mounted in operative association with said body tube and having a cam for controlling movement of said optical element for contributing to a zooming function, said cam sleeve being rotatable about said optical axis upon actuation of said zoom ring to move said optical element;
   said body tube being made of plastic material and being provided with a groove;
   said cam sleeve being made of metallic material and being provided with a groove corresponding to said groove of said body tube; said cam sleeve having both ends made as free ends so as to be able to be displaced in the direction parallel to said optical axis; and
   an engagement member which engages with both of said groove of said body tube and said groove of said cam sleeve for regulating deviation in the relative positions in the direction parallel to the optical axis of said body tube and said cam sleeve derived from changes in ambient temperature.

2. A mechanical mounting according to claim 1, wherein said engagement member comprises a retainer pin and a roller rotatably mounted on said pin and movably fitted in said groove of said body tube.

3. A mechanical mounting for a zoom lens, comprising:
   a fixed sleeve;
   an intermediate sleeve made of plastic material and fixed to said fixed sleeve and having a groove provided at the inside thereof;
   a zoom ring;
   a cam sleeve which rotates about an optical axis by operating said zoom ring and which is fitted in the inside of said intermediate sleeve, said cam sleeve being made of metallic material and having a cam for moving said optical element which contributes to a zooming function and a groove corresponding to said groove of said intermediate sleeve, said cam sleeve having both ends free in the direction parallel to the optical axis; and
   an engagement member which engages with both the groove of said intermediate sleeve and the groove of said cam sleeve and is fixed to either one of the intermediate sleeve or the cam sleeve, so as to regulate deviations in relative positions in the direction parallel to the optical axis of said intermediate sleeve and of said cam sleeve.

* * * * *